3,210,428
POLYOLS FROM 2-HYDROXYMETHYL-1,3-DI-
OXOLANE AND PHENOLIC COMPOUNDS
Howard R. Guest and Robert K. Barnes, Charleston,
W. Va., assignors to Union Carbide Corporation, a
corporation of New York
No Drawing. Filed Sept. 4, 1959, Ser. No. 838,028
5 Claims. (Cl. 260—619)

This invention relates to new chemical compounds and to their method of preparation. More particularly the invention relates to a novel class of polyols which are exemplified in simplification by the following general formula in which X and Y represent hydroxyaryl radicals.

(I)

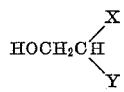

The polyol compounds which conform to the structural configuration shown above are identified as 2,2-(hydroxyaryl)-ethanols. In general the new compounds are obtained by a process which broadly comprises reacting a phenolic compound with 2-hydroxymethyl-1,3-dioxolane in the presence of an acid catalyst. The novel polyols are useful as non-ionic detergents and as anti-oxidants for various lubricant and gasoline compositions. Because of their polyfunctional nature the compounds are eminently suited as intermediates in the preparation of elastomers and foams.

The phenolic compounds used as starting materials for production of the polyols include a wide variety of compounds in which a hydroxyaryl radical is contained. As used herein the term "phenolic" refers to a hydroxyaryl compound in which a hydroxy group is directly attached to an aromatic nucleus. The term "phenolic" thus includes the mononuclear mono- and polyhydroxybenzenes such as phenol and resorcinol, etc.; hydrocarbon-substituted hydroxybenzenes such as 4-tolylresorcinol, p-phenylphenol, p-benzylphenol, etc.; fused aromatic systems such as α and β naphthol, etc.; and the polynuclear hydroxybenzenes such as the various di-, tri- and tetraphenylol compounds. The phenolic compounds must have at least one reactive ortho or para position open and can be substituted to the extent that the substituents are nonreactive, i.e., they do not substantially interfere with reaction between 2-hydroxymethyl-1,3-dioxolane and a phenolic hydroxyl under the reaction conditions employed. As an example, the phenolic compounds may have only hydrogen atoms on the aromatic nucleus, or they can be substituted with one or more monovalent substituents in replacement of hydrogen atoms as with nitro, fluoro, chloro, bromo, sulfo, sulfino, phospho, etc., and the organic derivatives thereof. Similarly, if a monovalent hydrocarbon radical is attached to the aromatic nucleus one or more of its hydrogen atoms may be replaced with a nitro or tertiary amine group, or with a halogen such as chlorine or bromine, etc.

Exemplary mononuclear monohydroxy benzenes which can be utilized include phenol, o-, m- or p-cresols, 2,3,5,6-tetramethyl phenol, ethyl and diethyl phenols, amyl phenols, nonyl phenols, p-cyclohexyl phenol, 2-6-dicyclohexyl phenol, cyclopentyl phenol, cycloheptyl phenol, the xylenols, bromophenols, nitrophenols, the chlorophenols, e.g., 2-methyl-5-chlorophenol, and alkoxyphenols such as the isomeric methoxy, ethoxy and butoxy phenols, as well as the dialkyl ethers such as the 1,3-dimethylether of pyrogallol. Exemplary mononuclear polyhydroxybenzenes include resorcinol, pyrogallol, phloroglucinol, catechol, orcinol, methyl phloroglucinol, 2,5,6-trimethyl resorcinol, 4 ethyl-5,6-dimethyl resorcinol, eugenol, isoeugenol, 4-cyclohexyl resorcinol, 4-chloro-5-methyl resorcinol, and the like.

Exemplary fused aromatic ring systems, in addition to the α and β naphthols above mentioned, include the alkyl substituted α and β naphthols, e.g., 6,8-dimethyl-1-naphthol, 4-butyl-1-naphthol, 1,5-dimethyl-2-naphthol, etc.; the aromatic derivatives of tetralin, such as tetrahydro α naphthol; and the various α and β hydroxyanthracenes.

The polynuclear hydroxybenzenes which may be employed as above noted, include the various di-, tri- and tetraphenylols in which two to four hydroxybenzene groups are attached to an aliphatic hydrocarbon radical containing one to twelve carbon atoms. The term "polynuclear" as distinguished from "mononuclear" is used to designate at least two benzene nuclei in a compound in which at least one hydroxyl group is directly attached to each benzene nucleus.

Exemplary diphenylol compounds include 2,2-bis(p-hydroxyphenyl)propane; bis(p-hydroxyphenyl)methane and the various diphenols and diphenylol methanes disclosed in U.S. Patents 2,506,486 and 2,744,882, respectively.

Exemplary triphenylol compounds which can be employed include the alpha,alpha,omega,tris(hydroxyphenyl)alkanes such as 1,1,3-tris(hydroxyphenyl)ethanes; 1,1,3-tris(hydroxyphenyl)propanes; 1,1,3-tris(hydroxy-3-methylphenyl)propanes; 1,1,3-tris(dihydroxy-3-methylphenyl)propanes; 1,1,3-tris(hydroxy-2,4-dimethylphenyl)propane; 1,1,3-tris(hydroxy-2,5-dimethylphenyl)propanes; 1,1,3-tris(hydroxy-2,6-dimethylphenyl)propane; 1,1,4-tris(hydroxyphenyl)butanes; 1,1,4-tris(hydroxyphenyl)-2-ethylbutanes; 1,1,4-tris(dihydroxyphenyl)butanes; 1,1,5-tris(hydroxyphenyl)-3-methylpentanes; 1,1,8-tris(hydroxyphenyl)octanes; 1,1,10-tris(hydroxyphenyl)decanes, and such corresponding compounds which contain substituent groups in the hydrocarbon chain, such as 1,1,3-tris(hydroxyphenyl)-2-chloropropanes; 1,1,3-tris(hydroxy-3-propylphenyl)-2-nitropropanes; 1,1,4-tris(hydroxy-3-decylphenyl)-2,3-dibromobutanes; and the like.

Tetraphenylol compounds which can be used in preparation of the new polyols include the alpha, alpha, omega, omega, tetrakis(hydroxyphenyl)alkanes such as 1,1,2,2-tetrakis(hydroxyphenyl)ethanes; 1,1,3,3-tetrakis(hydroxy-3-methylphenyl)propanes; 1,1,3,3-tetrakis(dihydroxy-3-methyphenyl)propanes; 1,1,4,4-tetrakis(hydroxyphenyl)butanes; 1,1,4,4-tetrakis(hydroxyphenyl)-2-ethylbutanes; 1,1,5,5-tetrakis(hydroxyphenyl)pentanes; 1,1,5,5-tetrakis(hydroxyphenyl)-3-methylpentanes; 1,1,5,5-tetrakis(dihydroxyphenyl)pentanes; 1,1,8,8-tetrakis(hydroxy-3-butylphenyl)octanes; 1,1,8,8-tetrakis(dihydroxy-3-butylphenyl)octanes; 1,1,8,8-tetrakis(hydroxy-2,5-dimethylphenyl)octanes; 1,1,10,10-tetrakishydroxyphenyl)decanes; and the corresponding compounds which contain substituent groups in the hydrocarbon chain such as 1,1,6,6-tetrakis(hydroxyphenyl)-2-hydroxyhexanes; 1,1,6,6-tetrakis(hydroxyphenyl)-2-hydroxy-5-methylhexanes; 1,1,7,7-tetrakis(hydroxyphenyl)-3-hydroxyheptanes; 1,1,3,3-tetrakis(hydroxyphenyl)-2-nitropropanes; 1,1,3,3-tetrakis(hydroxyphenyl)-2-chloropropanes; 1,1,4,4-tetrakis(hydroxyphenyl)-2,3-dibromobutanes; and the like.

The phenolic compounds employed as starting materials may be a single compound of definite composition or a mixture of isomers together with a small amount of residue product as obtained in the preparation of such compounds. Mixtures of phenolic compounds may also be used.

The polyols represented by Formula I given above are obtained by reacting the phenolic compound with 2-hydroxymethyl-1,3-dioxolane at temperatures ranging from about 40 to 130° C., preferably between about 40 to 100° C., under atmospheric or superatmospheric pressure. The phenolic compound is present in the reaction mixture in a ratio of at least two moles per mole of 2-hydroxymethyl-1,3-dioxolane and is preferably used within a range of two to eight moles. The products of the reaction generally contain a mixture of isomers in which the hydroxyl groups are located in the ortho or para position. The reaction may be illustrated by the following equation in which R is a hydrogen atom or monovalent radical and a is an integer of 1 to 5, preferably 1 to 3.

(II)

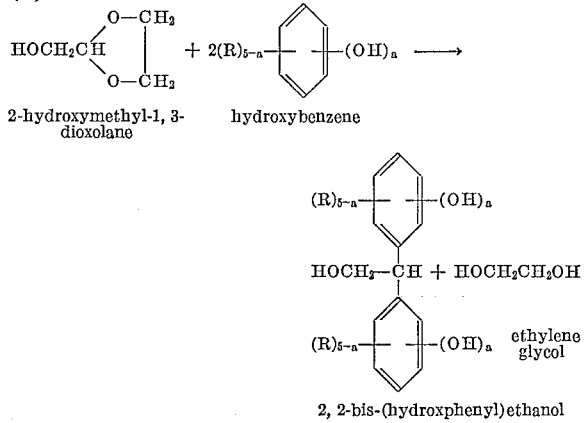

If desired the reaction can be conducted in the presence of an inert solvent such as the cylic and acylic ethers, dioxane tetrahydrofuran, ethyl ether, diethyl ether, diisopropyl ether, etc. Other useful solvents include miscellaneous organic solvents such as carbon tetrachloride, ethylene dichloride, dimethylformamide and the like. To the extent required, any conventional heat transfer means can be used to remove the exothermic heat of reaction.

To increase the rate of reaction an organic acid or mineral acid catalyst can be employed in an amount varying between 0.01% to 10%, preferably 0.1% to 5%, by weight based on the weight of the reactants. Exemplary catalysts include p-toluenesulfonic acid, chloracetic acid, ethanesulfonic acid, sulfuric acid, hydrochloric acid, zinc chloride, and the like. The preferred catalyst is hydrochloric acid although other hydrohalogenic acids, such as hydrobromic acid, may likewise be used.

Upon completion of the reaction, which usually requires about one-half to six hours, the reaction mixture is subjected to a simple stripping distillation step which can be accomplished in a continuous or batchwise manner. The stripping distillation involves distilling off, under reduced pressure, the excess phenolic material and ethylene glycol formed in the reaction. The stripping step also serves to remove the catalyst if a volatile acid is employed. The desired 2,2-(hydroxyaryl)ethanol is then recovered as the residue product from the distillation operation.

The 2-hydroxymethyl-1,3-dioxolane starting material used in the preparation of the new compounds described herein is a well known material and is described in United States Patent 2,140,938, hereby incorporated by reference to the extent pertinent.

The average molecular weight and reactivity of the polyols prepared herein can be determined readily by analysis for hydroxyl content. The hydroxyl number is a measure of and is proportional to the hydroxyl concentration per unit weight. The hydroxyl number is defined in terms of milligrams of KOH equivalent per gram of reaction product and is determined by reacting acetic anhydride (in pyridine solution) at refluxing temperature with the hydroxyl groups of the 2,2-(hydroxyaryl)ethanols. The unreacted anhydride and acetic acid formed are titrated with standard aqueous base using phenolphthalein as an indicator. The molecular weight can be readily calculated from the hydroxyl number by using the formula.

(II) $$M.W. = \frac{\text{Functionality} \times 1000 \times 56.1}{\text{Hydroxyl No.}}$$

The following examples illustrate the best mode now contemplated for carrying out the invention.

EXAMPLE I

*Preparation of 2,2-bis(hydroxyphenyl)ethanols*

Four moles of phenol were melted at 40° C. in a flask fitted with a stirrer, thermometer, condenser and dropping funnel. A solution of 5 cc. concentrated hydrochloric acid was added and one mole of 2-hydroxymethyl-1,3-dioxolane introduced slowly. The temperature was maintained between 40° C. to 60° C. with cooling until the addition was complete. The solution was allowed to warm to about 85° C. for about one hour. The product was stripped under vacuum of 4 to 8 mm. and a temperature of 62 to 160° C. A solid brown residue was obtained which analyzed as follows:

Molecular weight _____ 210
Equivalent wt./hydroxyl _____ 80.1

EXAMPLE II

*Preparation of 2,2-bis(methyl-hydroxyphenyl)ethanols*

Four moles of 2-hydroxymethyl-1,3-dioxolane was added with cooling to eight moles of ortho-cresol and 20 cc. of concentrated hydrochloric acid at 50 to 60° C. The mixture was heated for 1½ hours at 80° C., cooled and then stripped at 160° C. under 5 mm. pressure. The solid residue product analyzed as follows:

Molecular weight _____ 259.0
Equivalent wt./hydroxyl _____ 93.8

EXAMPLE III

*Preparation of 2,2-bis(trihydroxyphenyl)ethanol*

Four moles of pyrogallol and one mole of 2-hydroxymethyl-1,3-dioxolane were mixed and heated to about 100° C. When 0.2 cc. conc. hydrochloric was added the mixture was heated to 130° C. where it was maintained by cooling. The product was stripped at a temperature of 200° C. and 5 mm. pressure. The product analyzed as follows:

Molecular weight _____ 230
Equivalent wt./hydroxyl _____ 51

EXAMPLE IV

A charge of 2,2-bis(hydroxyphenyl)ethanol as prepared in Example I was reacted with propylene oxide. The reaction mixture was diluted with isopropanol and treated with Dowex 50 ion exchange resin and then vacuum stripped up to 150° C. at a pressure of 5 mm. Hg. The final product when analyzed had an equivalent weight per hydroxyl of 201.

One hundred and forty grams of the propylene oxide adduct of 2,2-bis(hydroxyphenyl)ethanol were mixed with 0.89 grams of dibutyltin dilaurate, 1.3 grams of a silicone oil surfactant (a siloxane-oxyalkylene copolymer) and 41 grams of "Freon 11." 60.4 grams of a mixture of 80% 2,4-20% 2,6-tolylene diisocyanates were then added under intensive agitation. As soon as the foaming reaction began, the mixture was transferred into an open mold.

The foaming was fast and the foam was allowed to cure for 10 minutes at 70° C. After two weeks aging at ambient temperatures the foam had the following physical properties:

Density, lbs./ft.³ _____ 1.6
Maximum compression load, p.s.i., at 4.8%
  deflection _____ 33
Closed cells, percent _____ 90

What is claimed is:
1. 2,2-bis(hydroxyphenyl)ethanol of the formula:

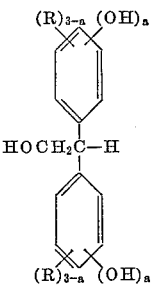

in which R is a member selected from the group consisting of hydrogen and alkyl of 1 to 5 carbon atoms, $a$ is an integer of 1 to 3 and each —(OH)$_a$ is in a position selected from the group consisting of ortho and para positions relative to

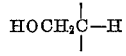

2. A method for the preparation of 2,2-bis(hydroxyphenyl)ethanol of the formula:

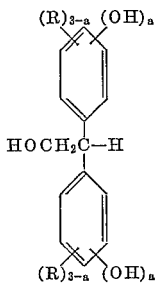

in which a phenolic compound of the formula:

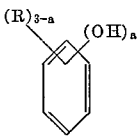

is reacted with 2-hydroxymethyl-1,3-dioxolane in the presence of hydrochloric acid at temperatures between about 40 to about 130° C., said phenolic compound being unsubstituted by (R)$_{3-a}$ in at least one position selected from the group consisting of ortho and para positions relative to —(OH)$_a$ and present in the reaction mixture in a ratio of from about 2 to about 8 mols per mol of 2-hydroxymethyl-1,3-dioxolane, in which R is a member selected from the group consisting of hydrogen and alkyl of 1 to 5 carbon atoms, $a$ is an integer of 1 to 3 and each —(OH)$_a$ is in a position selected from the group consisting of ortho and para positions relative to

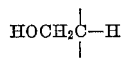

3. The method of claim 2 wherein the temperature is between about 40 and 100° C.

4.

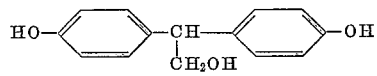

5.

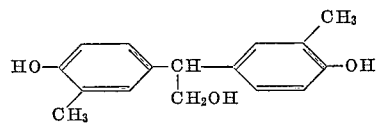

References Cited by the Examiner

UNITED STATES PATENTS

| | | | |
|---|---|---|---|
| 2,421,401 | 6/47 | Adler et al. | |
| 2,779,800 | 1/57 | Holm et al. | 260—619 |
| 2,798,079 | 7/57 | Linn | 260—619 X |

OTHER REFERENCES

Stillson et al.: Jour. Amer. Chem. Soc., vol. 67 (1945), 303—307 (5 pages).

Sisido et al.: Jour. Amer. Chem. Soc., vol. 71 (1949), 2037–41 (5 pages).

LEON ZITVER, *Primary Examiner.*

CHARLES B. PARKER, *Examiner.*